United States Patent
Kei et al.

(10) Patent No.: US 6,982,824 B2
(45) Date of Patent: Jan. 3, 2006

(54) THREE-DIMENSIONAL CONFOCAL MICROSCOPE SYSTEM

(75) Inventors: Takayuki Kei, Musashino (JP); Kenji Hachiya, Musashino (JP); Kenta Mikuriya, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 74 days.

(21) Appl. No.: 10/800,754

(22) Filed: Mar. 16, 2004

(65) Prior Publication Data

US 2005/0012989 A1     Jan. 20, 2005

(30) Foreign Application Priority Data

| Jul. 15, 2003 | (JP) | .............................. 2003-274520 |
| Aug. 28, 2003 | (JP) | .............................. 2003-303851 |
| Nov. 17, 2003 | (JP) | .............................. 2003-386449 |

(51) Int. Cl.
   *G02B 21/00*     (2006.01)

(52) U.S. Cl. ..................................... 359/368; 359/363
(58) Field of Classification Search ................ 359/363, 359/368, 383, 234, 235

See application file for complete search history.

(56) References Cited

U.S. PATENT DOCUMENTS

2002/0179828 A1 * 12/2002 Engelhardt et al. .......... 250/234

FOREIGN PATENT DOCUMENTS

JP      2002-72102      3/2002

OTHER PUBLICATIONS

A catalog introducing the VK-9500 ultra-deep 3D color imaging/shape measurement microscope from Keyence Corporation (checked out at the following URL through an Internet search on Aug. 14, 2003) <URL:http:www.keyence-.co.jp/microscope/product/VK9500/index.html>.

* cited by examiner

*Primary Examiner*—Mark A. Robinson
(74) *Attorney, Agent, or Firm*—Westerman, Hattori, Daniels & Adrian, LLP

(57) ABSTRACT

The present invention is characterized in that it is possible to provide a three-dimensional confocal microscope system configured so that an objective lens can be scanned in the optical-axis direction using an actuator to obtain sliced confocal images of a sample, wherein the actuator is driven using a scanning waveform signal, which is triangular or step-like and has been corrected so that acceleration is kept virtually constant at discontinuous points of change in the scanning waveform signal, thereby consistently providing sliced confocal images of the sample.

3 Claims, 13 Drawing Sheets

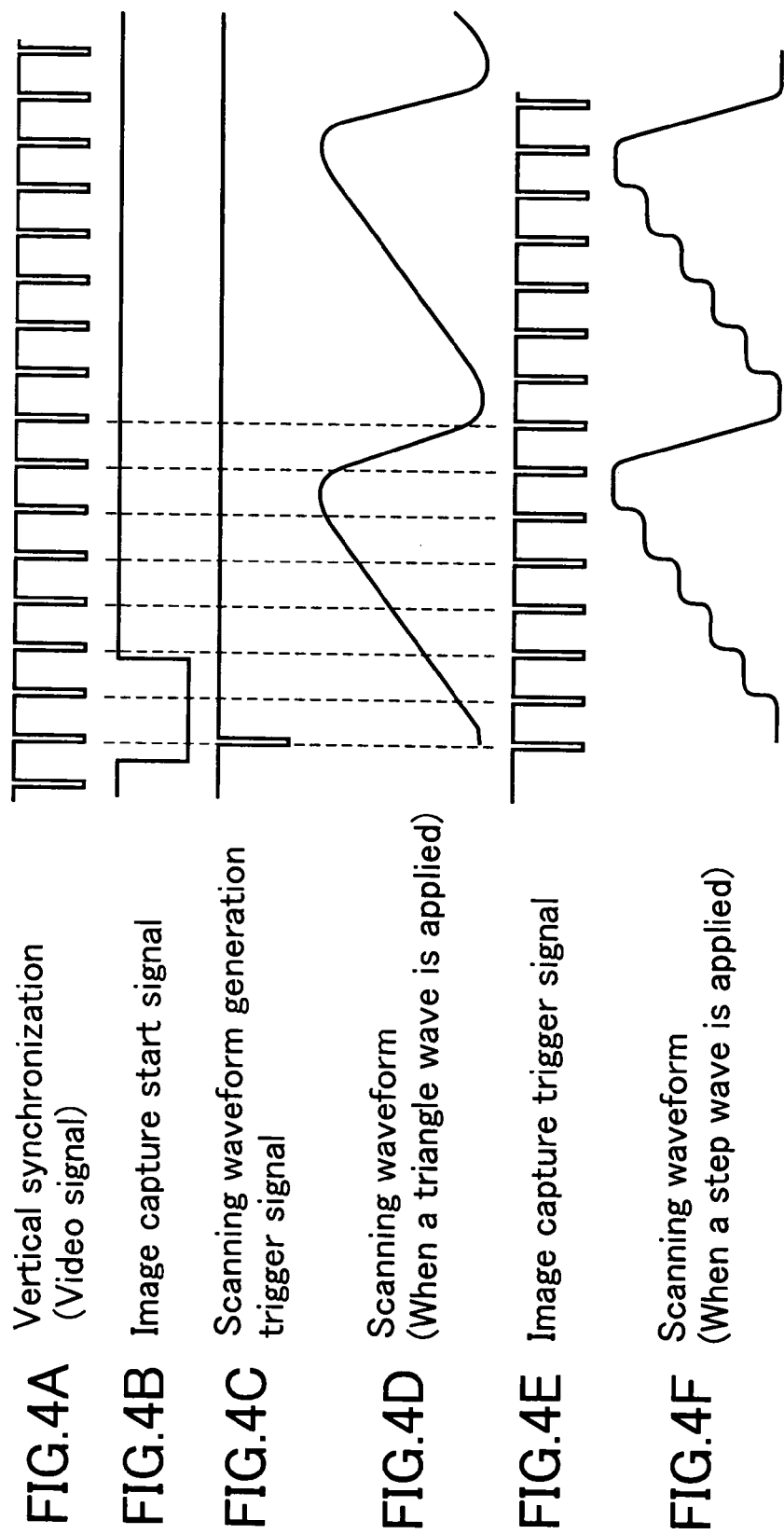

Relationship between waveform and vibration in the prior art

Relationship between waveform and vibration in the present invention

FIG.10A Vertical synchronization (Video signal)

FIG.10B Image capture start signal

FIG.10C Scanning waveform generation trigger signal

FIG.10D Scanning waveform (Isosceles triangle shaped wave)

FIG.10E Image capture trigger signal

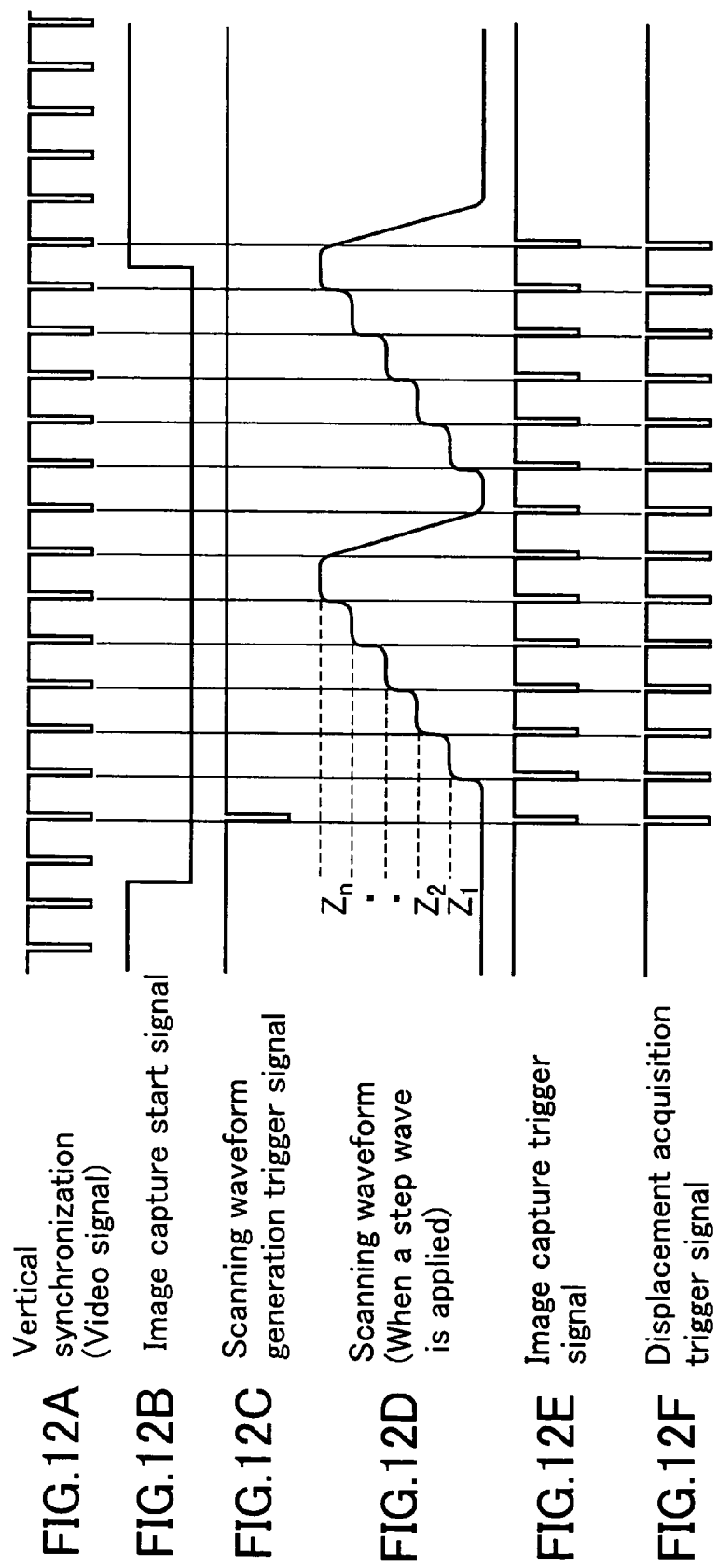

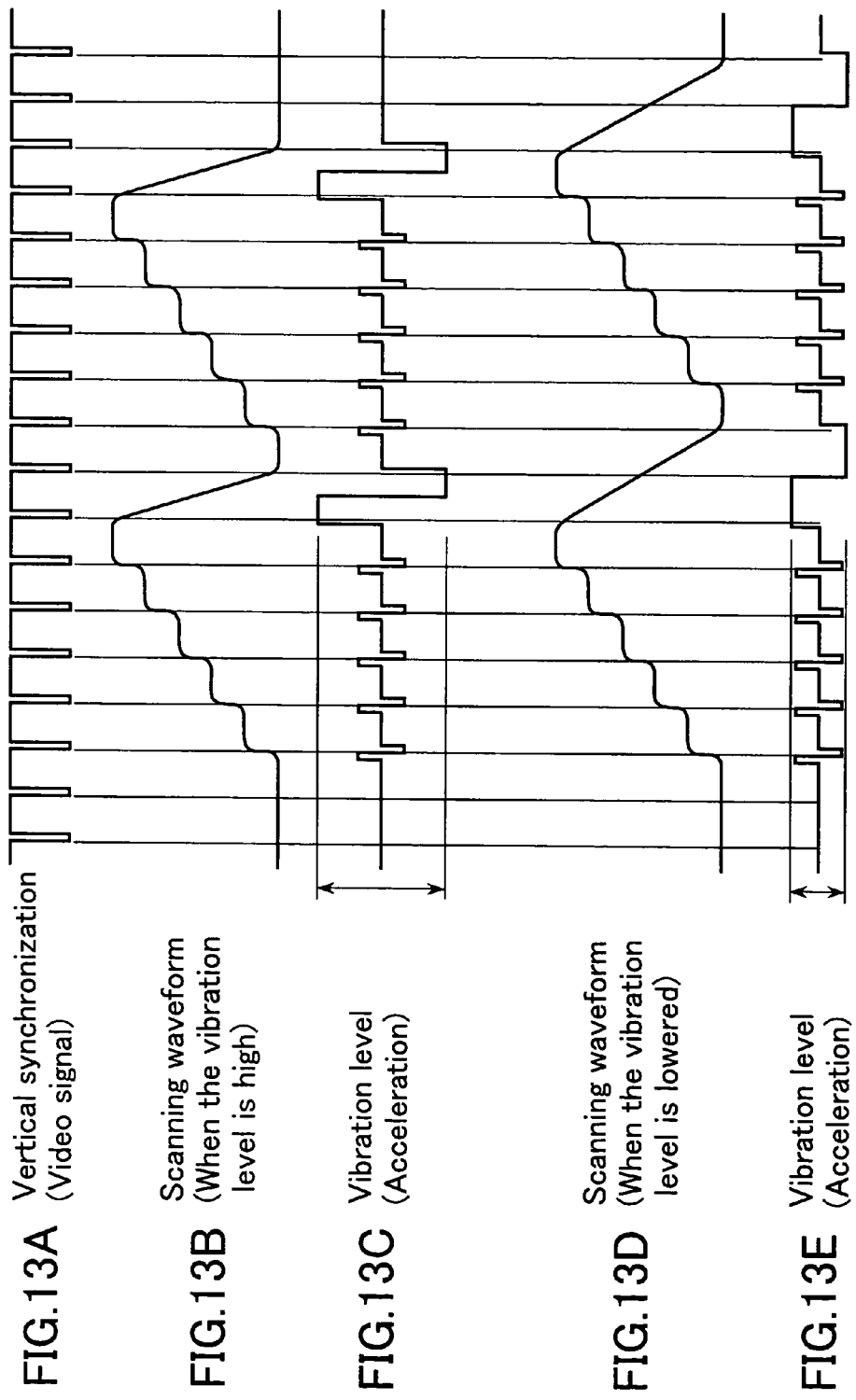

THREE-DIMENSIONAL CONFOCAL MICROSCOPE SYSTEM

BACKGROUND OF THE INVENTION

1. Field of the Invention

The present invention relates to a three-dimensional confocal microscope system and, more specifically, to improvements made in order to consistently obtain sliced confocal images of samples.

2. Description of the Prior Art

With a confocal microscope, it is possible to obtain sliced images of a sample without thinly segmenting the sample, and to construct a precise three-dimensional image from these sliced images. As a result, the confocal microscope is used for physiological reaction observation or for morphological observation of live cells in the fields of biology and biotechnology, or for the surface observation of LSI devices in the semiconductor market (see patent document 1, for example).

Note that in these sample observation modes, ultra-deep images (also referred to as omnifocal images) in full focus across the sample are required in some cases. In those instances, multiple sliced images at the respective focal positions of the sample are first obtained, then the images are subjected to image processing for synthesis so that an ultra-deep image is ultimately obtained (see non-patent document 1, for example).

Patent Document 1
Japanese Laid-open Patent Application 2002-72102
Non-Patent Document 1
A catalog introducing the VK-9500 ultra-deep 3D color imaging/shape measurement microscope from Keyence Corporation (checked out at the following URL through an Internet search on Aug. 14, 2003)
<URL:http://www.keyence.co.jp/microscope/product/VK9500/index.html>

FIG. 1 is a block diagram illustrating the configuration of the confocal microscope described in patent document 1.

Video rate camera 1, confocal scanner 2, microscope 3, actuator 4 and objective lens 5 are all aligned on the same optical axis. Confocal scanner 2 comprises a Nipkow disk having a multitude of pinholes and a microlens array associated with this disk. The confocal scanner is thus of a compact add-on type which is composed of a simple optical system, employing the Nipkow disk method.

This confocal scanner 2 is mounted on the camera port of microscope 3. Using laser light, the confocal microscope inputs images of the sample through objective lens 5, actuator 4 and microscope 3 to confocal scanner 2. Confocal scanner 2 receives confocal images of the sample and inputs them to video rate camera 1.

FIG. 2 is a timing chart of various signals dealt with by the confocal microscope illustrated in FIG. 1. Video rate camera 1 converts the confocal images to video signal 101 and inputs the signal to the signal input terminals of confocal scanner 2 and synchronization interface box 9 and to the video input terminal of image processing unit 6. Confocal scanner 2 is responsible for the rotational synchronization control of the Nipkow disk in synchronization with video signal 101.

In an application where a videotape deck is employed in image processing unit 6, the videotape deck simultaneously records both video signal 101 being input from the video input terminal and start signal 103 being input from the audio input terminal on long-playing videotape. On the videotape, confocal images in a real-time variation state and the timings to start scanning the focal positions of objective lens 5 are recorded simultaneously.

Synchronization interface box 9 selects either the even-numbered pulse train or odd-numbered pulse train of video signal 101 to produce internal signal A. Arbitrary waveform generator 7 generates trigger signal 102 which is a high-state pulse signal, there inputs the trigger signal to the trigger input terminal of synchronization interface box 9 so that the trigger signal is used for the timing to start scanning the focal plane in question.

Synchronization interface box 9 produces internal signal B in synchronization with the falling edges of trigger signal 102. This internal signal B has a high-state pulse width of approximately 35 ms, which is slightly wider than the one defined by the video rate of video rate camera 1. Synchronization interface box 9 generates start signal 103 by performing logical AND operation on the inverted signal of internal signal A and internal signal B, and inputs the start signal to the synchronization input terminals of image processing unit 6 and arbitrary waveform generator 7.

Image processing unit 6 starts image capture in which video signal 101 is converted to image data and recorded in synchronization with the rising edge of start signal 103 which is input through the synchronization input terminal. According to video signal 101 input through the signal input terminal, synchronization interface box 9 synchronizes all of the rotational synchronization control of the Nipkow disk by confocal scanner 2, the timing for image processing unit 6 to start obtaining video signals, and the timing for the optical control system to start scanning the focal positions of the objective lens. Arbitrary waveform generator 7 starts scanning the focal positions of objective lens 5 in synchronization with the rising edge of start signal 103, using the optical control system. In addition, arbitrary waveform generator 7 generates scanning signal 104 and inputs it to controller 8. Scanning signal 104 is a sawtooth signal that linearly rises from a low state to a high state over a specified period of time. Controller 8 inputs scanning signal 104 to actuator 4. Actuator position signal 105 is the positional signal of an actual actuator which after fully ramping up, falls back to the original level at one stroke, followed by an overshoot, where the period of the overshoot corresponds to a dead band.

Actuator 4 is installed between the objective lens revolver of microscope 3 and objective lens 5. The length of actuator 4 in the focal-point direction of images is changed by piezoelectric drive in proportion to the level of scanning signal 104, in order to control the focal position of objective lens 5. The confocal microscope obtains sliced images of the sample by scanning the focal plane thereof according to scanning signal 104.

According to the system configuration described above, the rotational synchronization control of the Nipkow disk, the timing for the image processing unit to start obtaining video signals, and the timing for the optical control system to start scanning the focal positions of the lens are all synchronized with the video signal. Consequently, the positional accuracy of confocal images increases, thereby eliminating variations in the time taken to obtain each sliced image when multiple sliced images are obtained and providing highly reliable sliced images.

In the conventional confocal microscope, however, a ramp wave (right-angled triangular wave) is used as the scanning waveform for the actuator to scan the focal plane of the objective lens. For this reason, enormous acceleration takes place in the actuator at each turn-around point of a waveform and a prolonged period of time is required for such acceleration to stabilize. Since accurate images cannot be obtained during this stabilization time, the conventional confocal microscope has been hampered in that the number of effective images that can be used for observation are decreased.

Furthermore, such enormous acceleration can result in vibration and resonance may take place if the vibration frequency matches the natural vibration frequency of the actuator itself and the microscope enclosure. This would lead to the problem that the surfaces of the sample become unstable and therefore cannot be correctly observed.

SUMMARY OF THE INVENTION

The present invention is intended to solve the foregoing problems inherent in the conventional confocal microscope discussed above. It is therefore an object of the present invention to provide a three-dimensional confocal microscope system that solves the foregoing problems by automatically calculating scanning waveforms in a manner less liable to cause vibration, and a drive for the actuator that uses these waveforms to scan the focal plane of the microscope's objective lens in the optical-axis direction, thereby enabling consistent obtainment of sliced confocal images of a sample.

BRIEF DESCRIPTION OF THE DRAWINGS

FIG. 4 is a timing chart of signals in accordance with the present invention.

FIG. 12 is yet another timing chart of signals in accordance with the present invention.

FIG. 13 is a timing chart illustrating the manner in which the acceleration of an actuator is controlled.

DETAILED DESCRIPTION OF THE PREFERRED EMBODIMENTS

The present invention is described in detail below with reference to the accompanying drawings.

(Embodiment 1)

Figure 1:
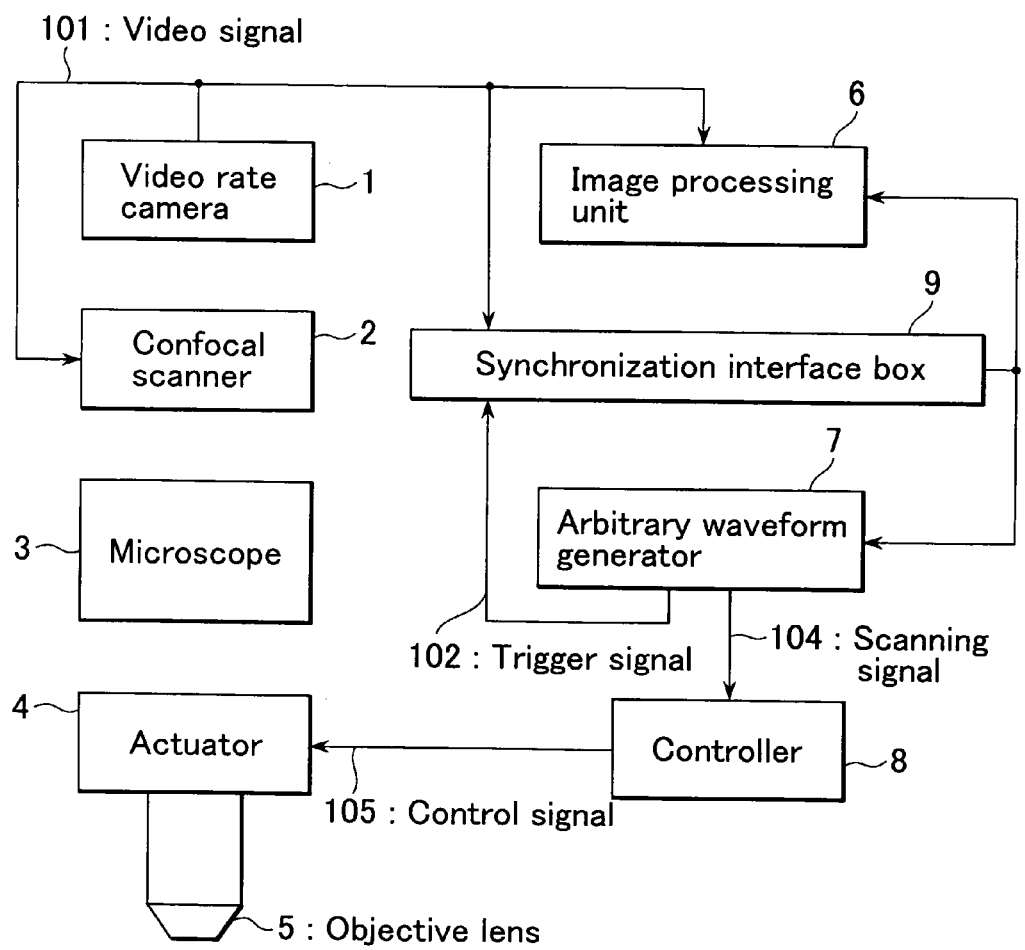
FIG. 1 is a block diagram illustrating one example of a conventional confocal microscope.
Figure 2:
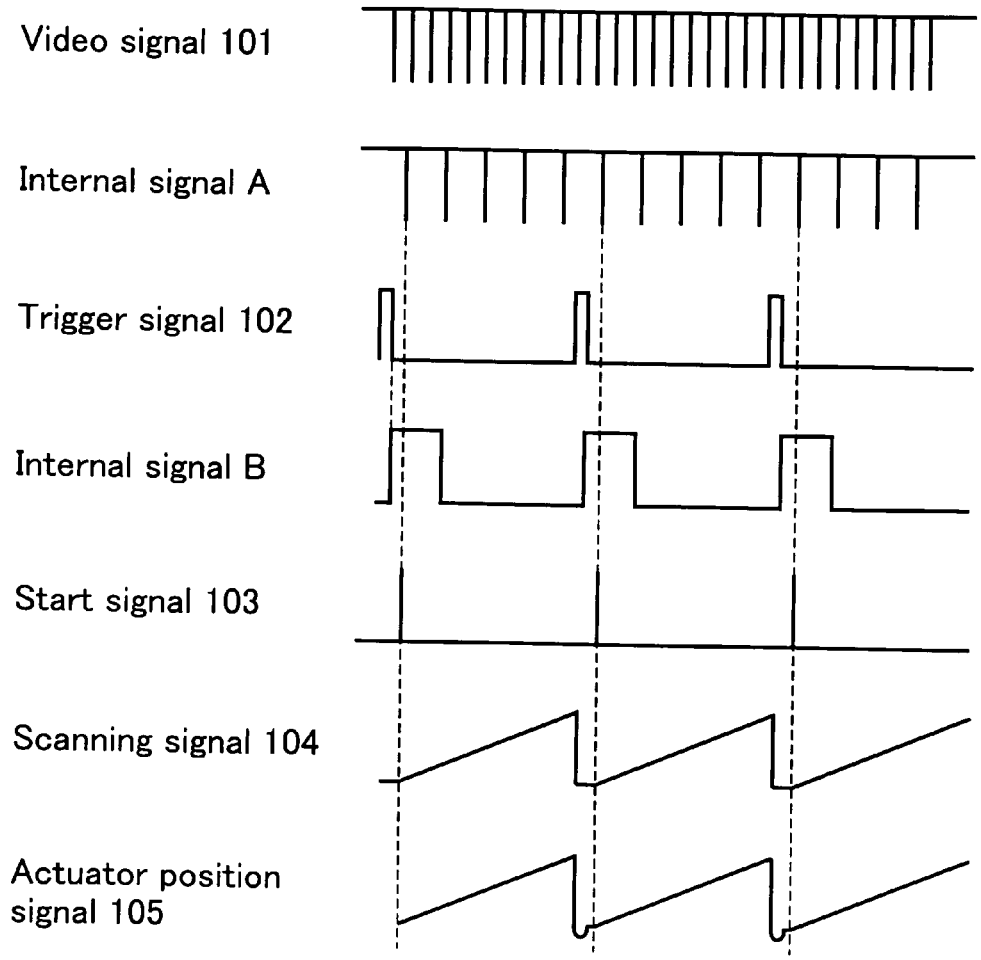
FIG. 2 is a timing chart of signals dealt with by the confocal microscope illustrated in FIG. 1.
Figure 3:
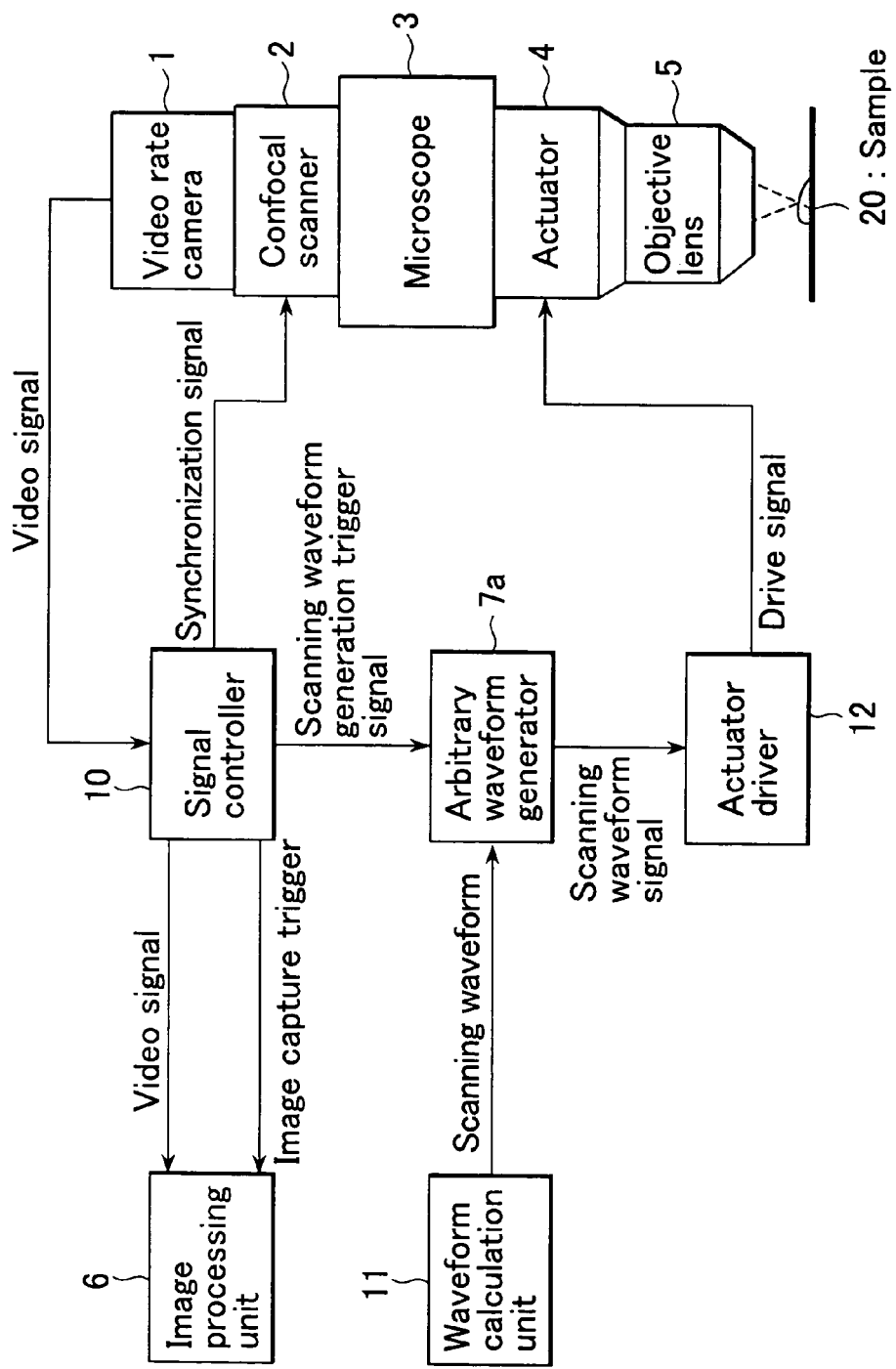
FIG. 3 is a block diagram illustrating one embodiment of the three-dimensional confocal microscope system in accordance with the present invention.

FIG. 3 is a block diagram illustrating a first embodiment of the three-dimensional confocal microscope system in accordance with the present invention. It should be noted that elements identical to those shown in the preceding figures are referenced alike and excluded from the description.

In FIG. 3, numeral 10 denotes a signal controller, numeral 11 denotes a waveform calculation unit, numeral 12 denotes an actuator driver and numeral 20 denotes a sample.

Signal controller 10 receives a video signal output from video rate camera 1 (hereinafter simply referred to as camera 1), outputs the video signal as it is while concurrently extracting vertical synchronization signals therefrom, and generates various trigger signals according to the vertical synchronization signals.

Arbitrary waveform generator 7a, upon reception of a scanning waveform generation trigger signal from signal controller 10, generates a triangular wave or step wave, which has been previously sent from waveform calculation unit 11 and saved, and sends the wave to actuator driver 12.

From the scanning period and optical-axis scanning distance of objective lens 5 applied when sample 20 is observed, waveform calculation unit 11 calculates a triangular wave or step wave whereby it is possible to prevent actuator 4 and the microscope enclosure from being subjected to vibration. The waveform calculation unit then outputs the wave to arbitrary waveform generator 7a as the scanning waveform.

Actuator driver 12 generates a drive signal for driving actuator 4 according to the scanning waveform signal output from arbitrary waveform generator 7a.

It should be noted here that the block consisting of waveform calculation unit 11, arbitrary waveform generator 7a, actuator driver 12 and signal controller 10 is referred to as control means.

Now the behavior of the confocal microscope system configured as explained above is described with reference to the timing chart of signals illustrated in FIG. 4. When the video signal (carrying vertical synchronization signals) illustrated in FIG. 4A is sent from camera 1 to signal controller 10, signal controller 10 sends the video signal to image processing unit 6 as it is, while concurrently extracting vertical synchronization signals from the video signal and sending them to confocal scanner 2, then generates various trigger signals, i.e., a scanning waveform generation trigger signal [FIG. 4C] and an image capture trigger signal [FIG. 4E].

Signal controller 10, upon reception of the image capture start signal illustrated in FIG. 4B, sends the first vertical synchronization signal encountered after the image capture start signal has fallen low to arbitrary waveform generator 7a as the scanning waveform generation trigger signal [FIG. 4C], while concurrently sending the vertical synchronization signal to image processing unit 6 as the image capture trigger signal illustrated in FIG. 4E. It should be noted that the image capture start signal is a signal that an operator inputs at any desired time from a higher-order controller (for example, a personal computer) to the signal controller, and that the pulse width of that signal is twice or more as wide as the period of the video signal's vertical synchronization signal.

Arbitrary waveform generator 7a, upon receipt of the scanning waveform generation trigger signal from signal controller 10, generates the triangular wave illustrated in FIG. 4D or the step wave illustrated in FIG. 4F, which has been previously input from waveform calculation unit 11 and saved, and sends the wave to actuator driver 12.

Actuator 4, which is driven by a drive signal from actuator driver 12, scans objective lens 5 in the optical-axis direction according to the waveform illustrated in FIG. 4D or FIG. 4F. Image processing unit 6 continuously obtains sliced cross-sectional images of sample 20 in synchronization with this scanning.

Figure 5A:
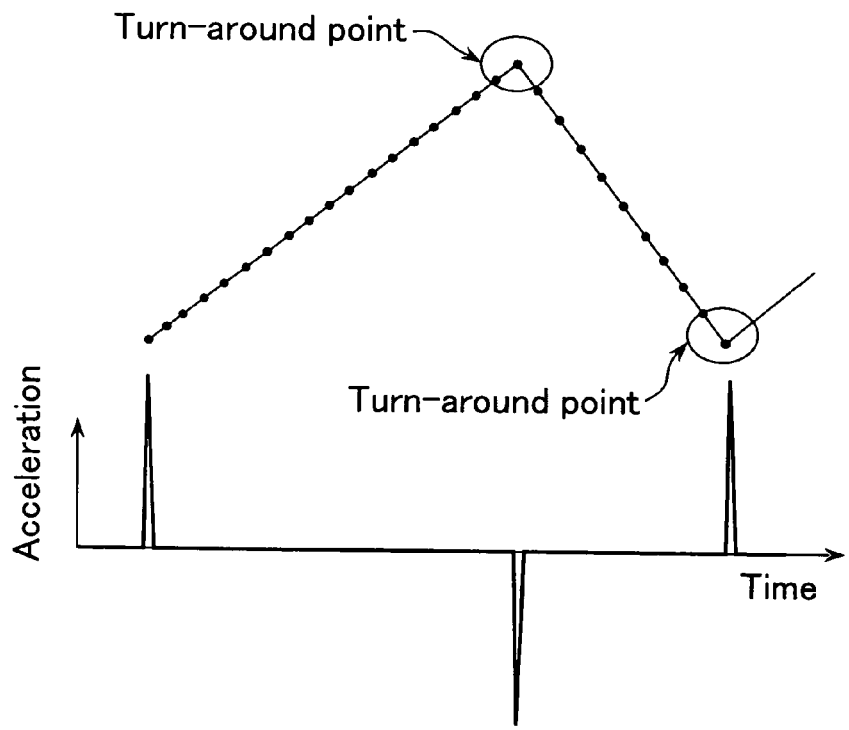
FIG. 5 is a graphical representation illustrating the relationship between scanning waveforms and acceleration.
Figure 5B:
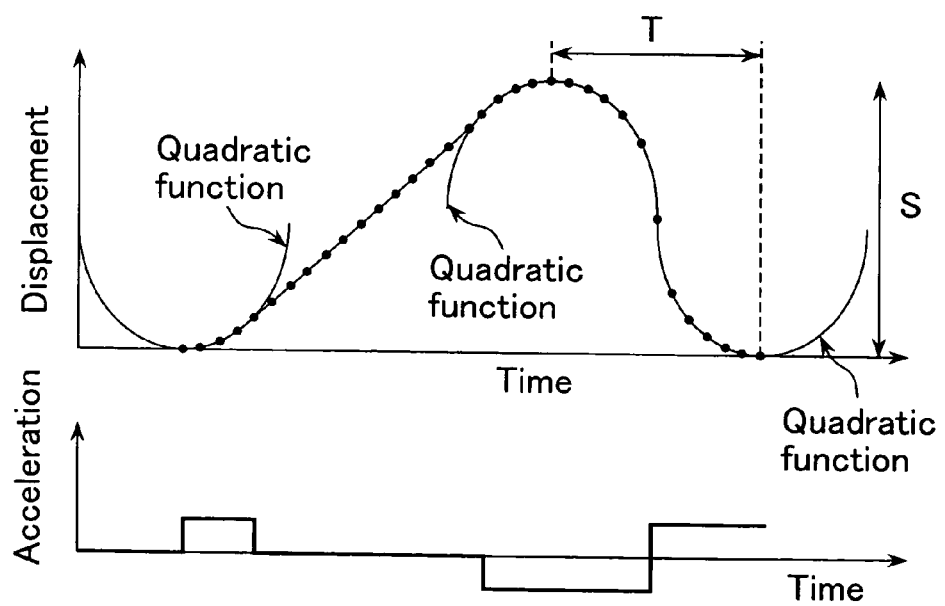

Next, scanning waveforms produced at waveform calculation unit 11 are explained below. FIG. 5 is a graphical representation that makes a comparison between the conventional confocal microscope system that uses a normal triangle wave as the scanning waveform of the objective lens [FIG. 5A] and the confocal microscope system in accordance with the present invention that uses a triangle-shaped waveform [FIG. 5B]. It should be noted that black dots in these figures are the data points of respective waveforms.

With the normal triangle wave, the amount of displacement at the turn-around points of the waveform changes drastically. Consequently, a high magnitude of acceleration takes place at these moments, serving to cause vibration. On the contrary, in the present invention, the wave has been corrected so that the amount of displacement is represented by quadratic functions at points where the waveform change is discontinuous, i.e., the turn-around points of the waveform. Thus, the wave has been reshaped so that it does not cause any abrupt acceleration changes (the magnitude of acceleration is low and virtually constant).

In the present invention, the system has been designed so that relational equation (1) below holds true among the scanning stroke S of the objective lens, the time T of the triangle-shaped wave's downward slope and acceleration a at the turn-around points.

$$a = S/T^2 \quad (1)$$

where stroke S is a variable set by an observer and time T is assumed to be an integral multiple of the imaging frame rate of the camera. Consequently, displacement s at the turn-around points is given by the following equation and is graphically represented as the waveform illustrated in FIG. 5B.

Accordingly, it is possible to prevent objective lens 5 and the microscope enclosure from being subjected to vibration.

$$s = a \cdot t^2 / 2 \quad (2)$$

where t is the elapsed time.

Figure 6A:
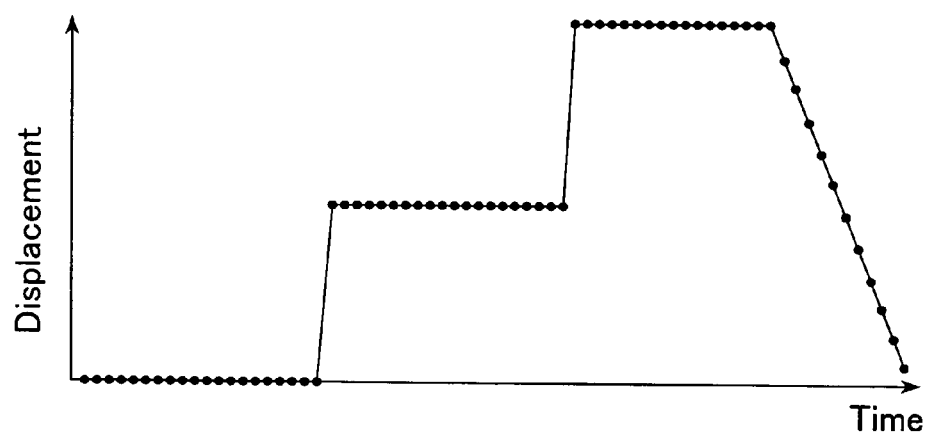
FIG. 6 is a graphical representation illustrating step waveforms.
Figure 6B:
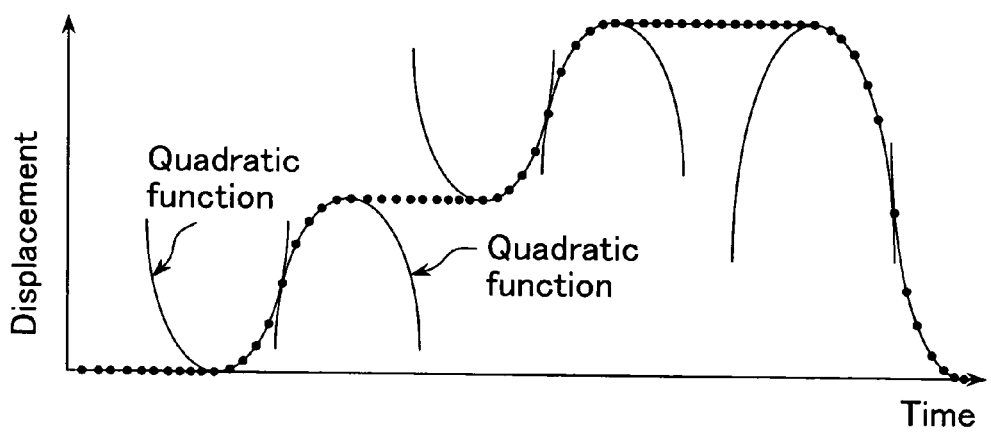

FIG. 6 is a comparative graphical representation in which the scanning waveform of objective lens 5 is defined as a step wave. FIG. 6A shows a waveform used in the prior art, whereas FIG. 6B shows a waveform used in the present invention. It should be noted that the parts of the waveform in which the wave returns from the full-stroke point to the zero point of scanning are the same as those of the triangle wave illustrated in FIG. 5.

In the case of the step wave illustrated in FIG. 6A, a high magnitude of acceleration takes place due to sudden changes in displacement when the step changes, resulting in vibration. In the case of the step wave illustrated in FIG. 6B in accordance with the present invention, however, the wave takes forms resulting from the quadratic functions of equation (2) where the step changes. Thus the changes are gentle and smooth, involving only a low magnitude of acceleration. Therefore, even in the case of step waveforms, it is also possible to prevent objective lens 5 and the microscope enclosure from being subjected to vibration.

Figure 7A:
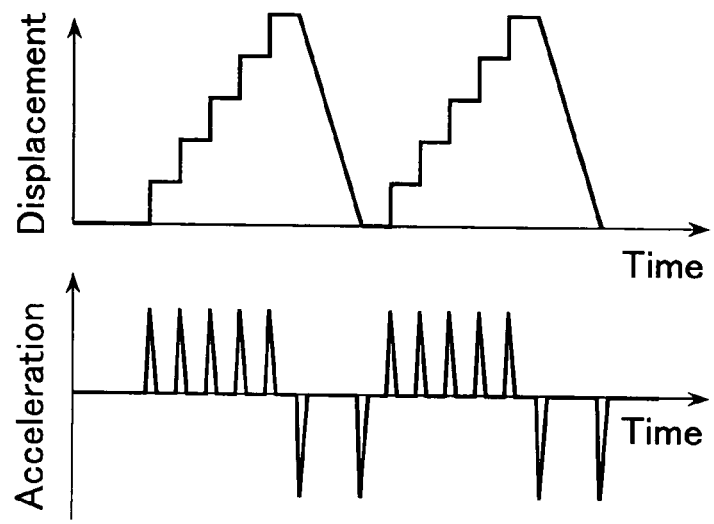
FIG. 7 is a graphical representation illustrating the relationship between step waveforms and acceleration.
Figure 7B:
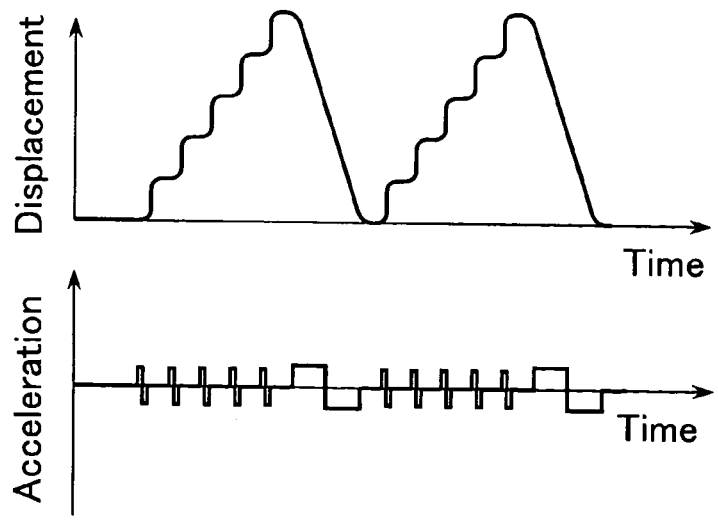

FIG. 7 is a graphical representation that compares the displacement and acceleration for a step waveform between the prior art confocal microscope system [FIG. 7A] and the confocal microscope system in accordance with the present invention [FIG. 7B].

As described above, according to the present invention, it is possible to automatically calculate scanning waveforms less liable to cause vibration and, by driving the actuator using the waveforms thus calculated, easily scan the focal positions of the objective lens in the optical-axis direction while keeping vibration to a minimum.

(Embodiment 2)

Figure 8:
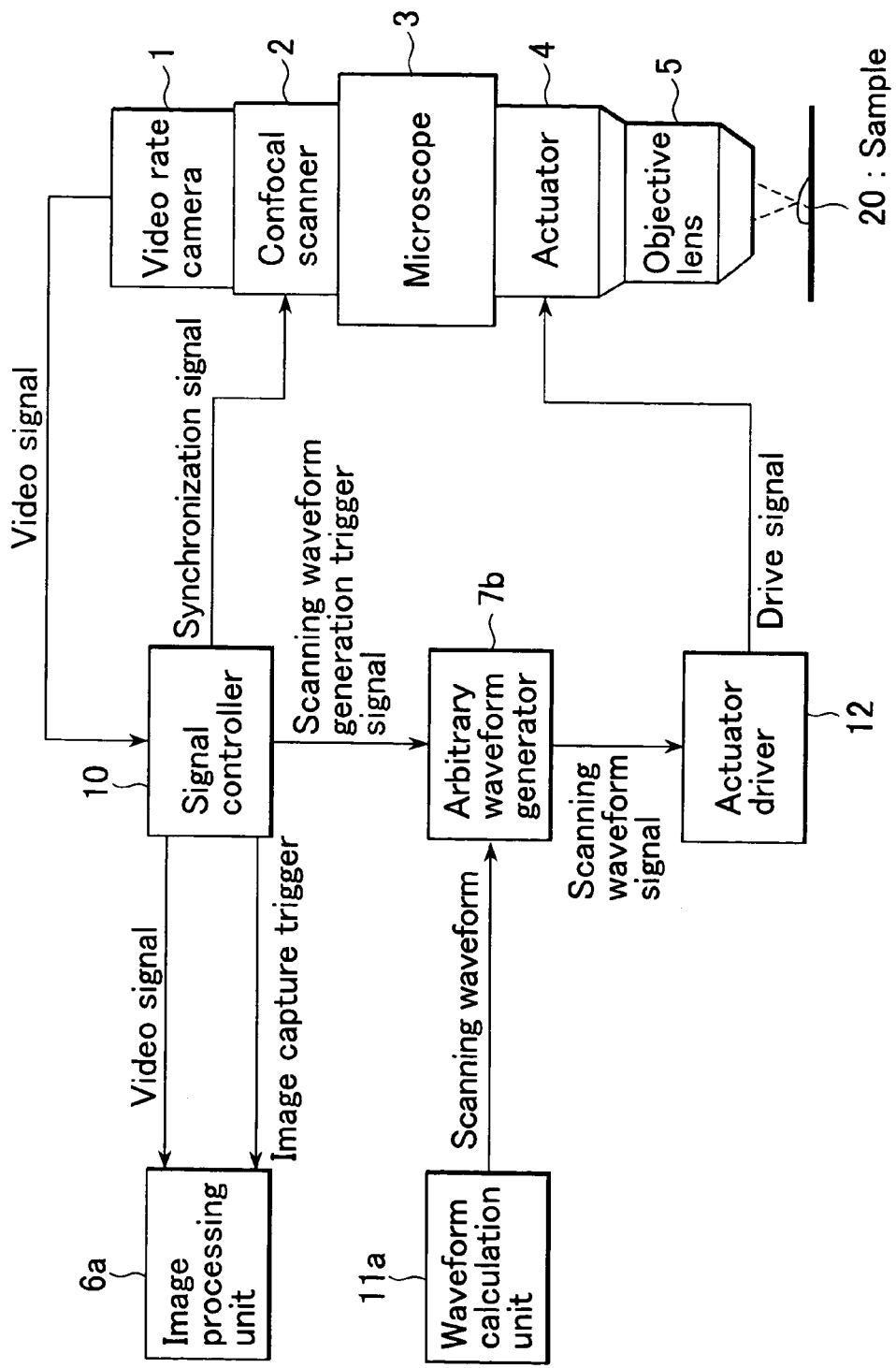
FIG. 8 is a block diagram illustrating another embodiment of the three-dimensional confocal microscope system in accordance with the present invention.

FIG. 8 is a block diagram illustrating a second embodiment of the three-dimensional confocal microscope system in accordance with the present invention.

It should be noted that elements identical to those shown in the preceding figures are referenced alike and excluded from the description.

Signal controller 10 receives a video signal output from camera 1, outputs the video signal as it is while concurrently extracting vertical synchronization signals therefrom, and generates various trigger signals according to the vertical synchronization signals.

Arbitrary waveform generator 7b, upon reception of a scanning waveform generation trigger signal from signal controller 10, generates an isosceles triangle shaped wave, which has been previously sent from waveform calculation unit 11a and saved, and sends the wave to actuator driver 12.

From the scanning period and optical-axis scanning distance of objective lens 5 applied when sample 20 is observed, waveform calculation unit 11a calculates an isosceles triangle shaped wave and outputs the wave to arbitrary waveform generator 7b as the scanning waveform.

Actuator driver 12 generates a drive signal for driving actuator 4 according to the scanning waveform signal output from arbitrary waveform generator 7b.

It should be noted here that the block consisting of waveform calculation unit 11a, arbitrary waveform generator 7b, actuator driver 12 and signal controller 10 is referred to as control means.

Figure 9:
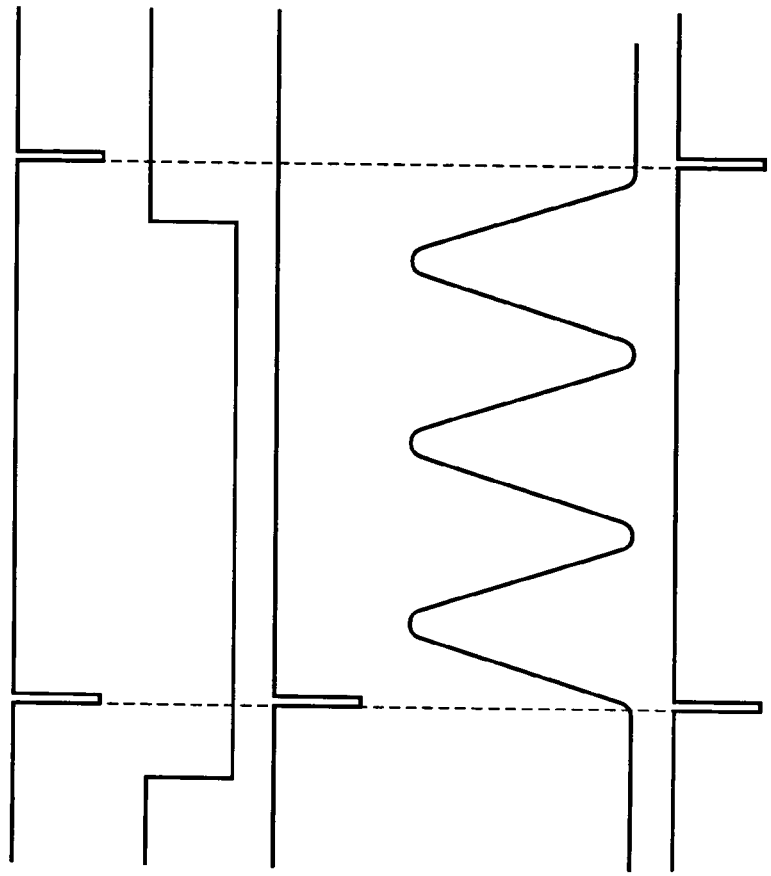
FIG. 9 is another timing chart of signals in accordance with the present invention.

Now the behavior of the confocal microscope system configured as explained above is described with reference to the timing chart of signals illustrated in FIG. 9. When the video signal (containing vertical synchronization signals) illustrated in FIG. 9A is sent from camera 1 to signal controller 10, signal controller 10 sends the video signal to image processing unit 6a as it is, while concurrently extracting vertical synchronization signals from the video signal and sending them to confocal scanner 2, and generates various trigger signals, i.e., a scanning waveform generation trigger signal [FIG. 9C] and an image capture trigger signal [FIG. 9E].

Signal controller 10, upon reception of the image capture start signal illustrated in FIG. 9B, sends the first vertical synchronization signal encountered after the image capture start signal has fallen low to arbitrary waveform generator 7b as the scanning waveform generation trigger signal [FIG. 9C], while concurrently sending the vertical synchronization signal to image processing unit 6a as the image capture trigger signal illustrated in FIG. 9E. It should be noted that the image capture start signal is a signal that an operator inputs at any desired time from a higher-order controller (for example, a personal computer), to the signal controller, and that the pulse width of that signal is twice or more as wide as the period of the video signal's vertical synchronization signal.

Arbitrary waveform generator 7b, upon receipt of the scanning waveform generation trigger signal from signal controller 10, generates the isosceles triangle shaped wave illustrated in FIG. 9D, which has been previously input from waveform calculation unit 11a and saved, and sends the wave to actuator driver 12. Actuator 4, which is driven by a drive signal from actuator driver 12, scans objective lens 5 in the optical-axis direction according to the waveform illustrated in FIG. 9D. Image processing unit 6a obtains ultra-deep images of sample 20 in synchronization with this scanning.

Since camera 1's imaging speed per frame in relation to objective, lens scanning is sufficiently low, the sliced images of the sample being scanned at respective focal positions are taken with the images overlying each other. Image processing unit 6a converts a video signal of these images to image data, thus providing ultra-deep images.

In the series of actions explained above, there are three isosceles triangle shaped waves [FIG. 9D] which comprise the scanning waveform for driving actuator 4, within a single period of video signal [FIG. 9A] (frame period of camera 1). With these waves, it is possible to expose all of the cross-sections of the sample within a single frame of the video signal, thereby providing ultra-deep images as a single picture.

Since displacement is made linear in relation to time by driving actuator 4 using the isosceles triangle shaped waves, the exposure time for respective cross-sections of the sample is uniform and the brightness information of the resulting ultra-deep images is accurate.

It should be noted that a minimum of one isosceles triangle shaped wave is required to exist within a single period of the video signal. The relationship between the period of the video signal's vertical synchronization signal and the period of the isosceles triangle shaped wave is as follows:

Period of video signal's vertical synchronization signal= $n$×period of isosceles triangle shaped wave (where, $n$ is an integer)

Another point to note is that waveform calculation unit 11 performs calculations based on S-curve control in order to keep acceleration constant at the turn-around points of the isosceles triangle shaped wave. Consequently, it is possible to produce isosceles triangle shaped waves capable of preventing actuator 4 and the microscope enclosure from being subjected to vibration.

Figure 10:
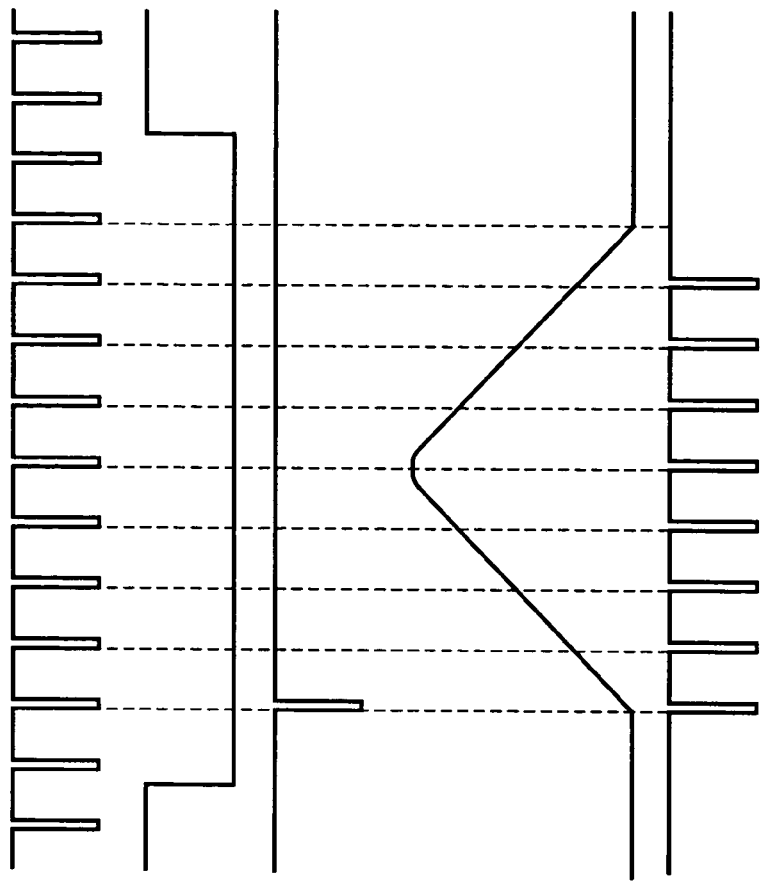
FIG. 10 is a timing chart of when the period of a scanning waveform is lengthened to an integral multiple of the period of a video signal's vertical synchronization signal.

FIG. 10 is a timing chart of when the period of a scanning waveform is lengthened to an integral multiple of the period of a video signal's vertical synchronization signal.

In FIG. 10, the roles of individual signals are identical to those of the signals discussed above with reference to FIG. 9. In this timing chart, the period of the isosceles triangle shaped scanning signal [FIG. 10D] with which actuator 4 is manipulated is lengthened to an integral multiple of the period of the video signal's vertical synchronization signal [FIG. 10A], so that sliced images are obtained for respective focal positions during a single scan of actuator 4. Ultra-deep images can then be obtained by having image processing unit 6a integrate or average image data composed of multiple frames of these sliced images. In other words, it is possible to make a real-time observation of integrated or averaged images since the brightness information of the sample's cross-sections is uniform. This feature is especially advantageous when observing dark (low-reflectance) samples.

As described above, one advantage provided by the present invention is that at least one scanning waveform for driving the actuator exists within the period of the video signal's vertical synchronization signal. Consequently, it is possible to realize a three-dimensional confocal microscope system whereby ultra-deep images of the sample can be obtained in real time by scanning the objective lens at speeds higher than the imaging speed of the camera.

Another advantage is that, since displacement is made linear in relation to time by driving the actuator using the isosceles triangle shaped waves, the exposure time for respective cross-sections of the sample is uniform and the brightness information of the resulting ultra-deep images is accurate.

Yet another advantage is that S-curve control is performed at turn-around points of the isosceles triangle shaped wave so that acceleration is kept constant, thus preventing the actuator and microscope enclosure from being subjected to vibration.

Yet another advantage is that the period of the isosceles triangle shaped scanning signal with which the actuator is manipulated is lengthened to an integral multiple of the period of the video signal's vertical synchronization signal, so that sliced images are obtained from respective focal positions during a single scan of actuator 4. Ultra-deep images can then be obtained by integrating or averaging image data composed of multiple frames of these sliced images. In other words, it is possible to make a real-time observation of integrated or averaged images since the brightness information of the sample's cross-sections is uniform. This feature is especially advantageous when observing dark (low-reflectance) samples.

Accordingly, the confocal microscope system of the present invention can solve the problem of the prior art lacking real-time capability due to the fact that as described in non-patent document 1, the objective lens is moved in the Z-axis direction using a lens-moving mechanism, such as an actuator and that all of the sliced images obtained at respective focal positions are acquired before the images are overlaid to create an ultra-deep image.

(Embodiment 3)

Figure 11:
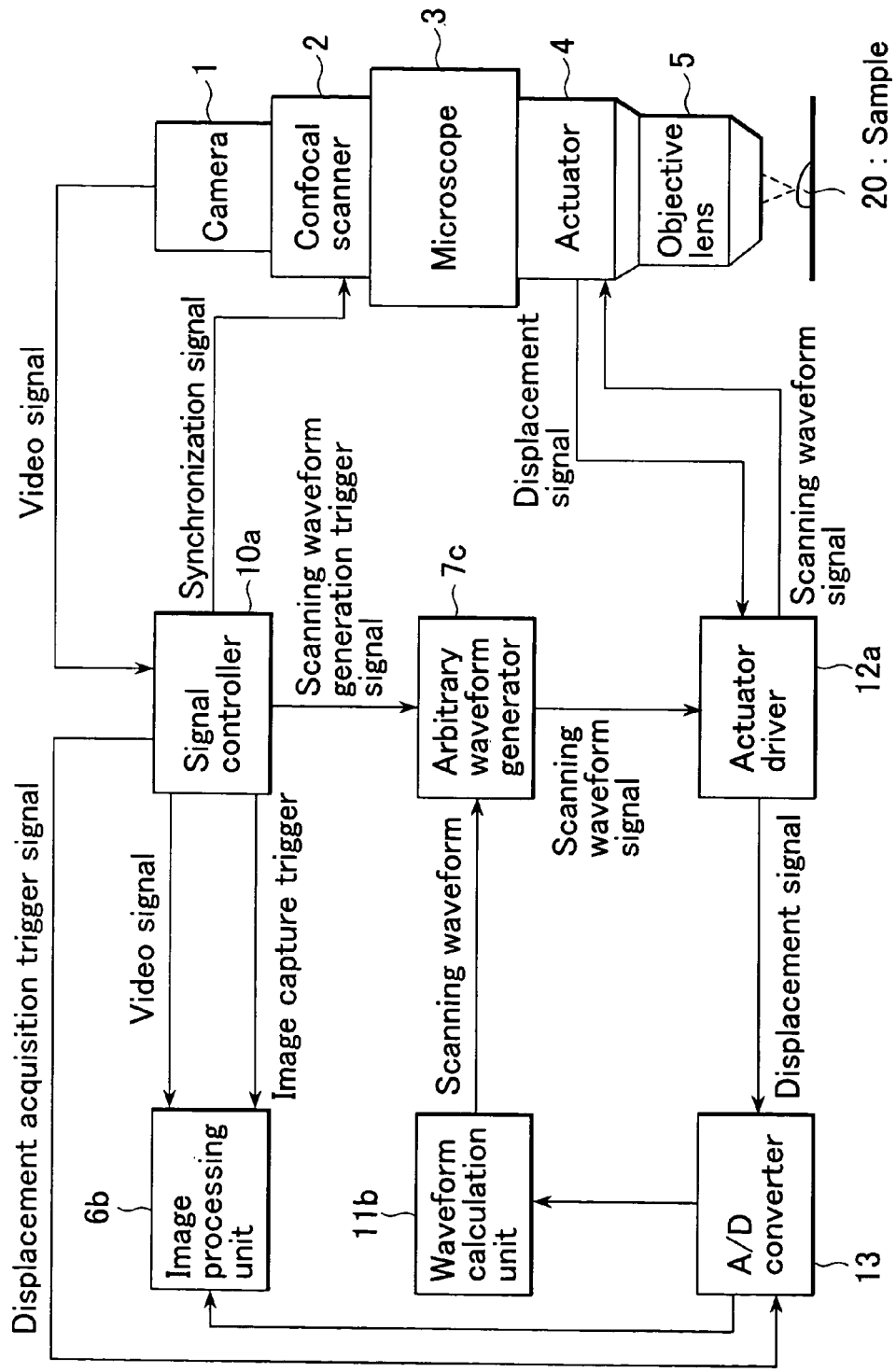
FIG. 11 is a block diagram illustrating yet another embodiment of the three-dimensional confocal microscope system in accordance with the present invention.

FIG. 11 is a block diagram illustrating a third embodiment of the three-dimensional confocal microscope system in accordance with the present invention.

In FIG. 11, signal controller 10a receives a video signal output from camera 1, outputs the video signal as it is while concurrently extracting vertical synchronization signals therefrom, and generates various trigger signals according to the vertical synchronization signals.

Arbitrary waveform generator 7c, upon reception of a scanning waveform generation trigger signal from signal controller 10a, generates an isosceles triangle shaped wave, which has been previously sent from waveform calculation unit 11b and saved, and sends the wave to actuator driver 12a.

From the scanning period and optical-axis scanning distance of objective lens 5 applied when sample 20 is observed, waveform calculation unit 11a calculates a triangle wave or step wave and outputs the wave to arbitrary waveform generator 7c as the scanning waveform.

Actuator driver 12a generates a drive signal for driving actuator 4 according to the scanning waveform signal output from arbitrary waveform generator 7b.

Actuator 4 scans objective lens 5 in the optical-axis direction according to the output waveform of arbitrary waveform generator 7c and image processing unit 6b continuously obtains sliced cross-sectional images of the sample under observation in synchronization with the scanning.

In addition, actuator 4 is provided with a displacement sensor (not illustrated in the figure) for sensing the displacement of the actuator itself. This displacement sensor outputs a displacement signal to feed it back to actuator driver 12b so that actuator 4 is subjected to position control. At this point, an error may occur between the target position (estimated position) and the actual position.

Actuator driver 12a outputs the displacement signal it has obtained to A/D converter 13. A/D converter 13 converts the displacement signal in synchronization with an image capture trigger in order to produce displacement data that represents the amount of displacement of actuator 4 or, more specifically, the amount of displacement of objective lens 5 in the optical-axis direction.

Image processing unit 6b determines the precise optical-axis positions of sliced images from this displacement data and synthesizes the sliced images to produce a three-dimensional image, thus providing a highly precise three-dimensional image.

It should be noted here that the block consisting of waveform calculation unit 11b, arbitrary waveform generator 7c, actuator driver 12a, signal controller 10a and A/D converter 13 is referred to as control means.

Now the behavior of the confocal microscope system configured as explained above is described with reference to the timing chart of signals illustrated in FIG. 12.

When the video signal (containing vertical synchronization signals) illustrated in FIG. 12A is sent from camera 1 to signal controller 10a, signal controller 10a sends the video signal to image processing unit 6b as it is, while concurrently extracting vertical synchronization signals from the video signal and sending them to confocal scanner 2, then generates various trigger signals, i.e., a scanning waveform generation trigger signal [FIG. 12C] and an image capture trigger signal [FIG. 12E].

Signal controller 10a, upon reception of the image capture start signal illustrated in FIG. 12B, sends the first vertical synchronization signal encountered after the image capture start signal has fallen low to arbitrary waveform generator 7a as the scanning waveform generation trigger signal [FIG. 12C], while concurrently sending the vertical synchronization signal to image processing unit 6b as the image capture trigger signal illustrated in FIG. 12E. It should be noted that the image capture start signal [FIG. 12B] is a signal that an operator inputs at any desired time from a higher-order controller (for example, a personal computer) to the signal controller, and that the pulse width of that signal is twice or more as wide as the period of the video signal's vertical synchronization signal.

Arbitrary waveform generator 7c, upon receipt of the scanning waveform generation trigger signal from signal controller 10a, generates the step wave illustrated in FIG. 12D, which has been previously input from waveform calculation unit 11b and saved, and sends the wave to actuator driver 12a.

Note that although a step wave, the voltage of which increases step by step as the time elapses and returns to the original voltage when the prescribed voltage level is reached, is used as the scanning waveform, as illustrated in FIG. 12D, it is possible to use a triangle wave instead as the scanning waveform.

Actuator 4, which is driven by a drive signal from actuator driver 12a, scans objective lens 5 in the optical-axis direction according to the waveform illustrated in FIG. 12D. Image processing unit 6b obtains images of sample 20 in synchronization with this scanning.

In the series of actions explained above, the displacement sensor provided in actuator 4 outputs displacement signals for the individual steps (Z1, Z2, . . . , Zn) of the step wave. These displacement signals are A/D-converted by A/D converter 13 to produce displacement data. This displacement data is used to determine the actual positions of sliced images in relation to the sample being observed and to synthesize a three-dimensional image, thus providing a highly precise three-dimensional image.

Next, an explanation is made of the control of acceleration when the actuator is displaced.

Waveform calculation unit 11b calculates the absolute value of acceleration reached during one period of the scanning waveform from the displacement data output by A/D converter 13. If the absolute acceleration value exceeds a preset value, acceleration is controlled so that the absolute value thereof is kept below the preset value.

Acceleration is calculated using the following equations:

Velocity $V$=linear differentiation of displacement=$dz/dt$

Acceleration $a$=linear differentiation of=$dv/dt$ where z is displacement and t is time.

Now the behavior of the confocal microscope system configured as explained above is described with reference to the timing chart of individual signals illustrated in FIG. 13. FIG. 13 is a timing chart illustrating the manner in which the acceleration of an actuator is controlled.

In FIG. 13, FIG. 13A indicates a vertical synchronization signal (video signal) sent from camera 1 to signal controller 10a. FIG. 13B indicates a stair-like scanning waveform calculated by waveform calculation unit 11b.

The step waveform changes in synchronization with the falling edges of the vertical synchronization signal. S-curve control is performed at these discontinuous points of change in order to reduce acceleration. Thus, the amplitude of acceleration at these points is kept constant and acceleration changes in a rectangular form, as shown in FIG. 13C. FIG. 13C is a graphical representation of acceleration determined from displacement data and time.

The relationship between velocity and acceleration in S-curve control is represented by the following equations:

Displacement $z=(\frac{1}{2}) \cdot A \cdot t^2$

Velocity $v$=Linear differentiation of displacement $z=A \cdot t$

Acceleration of $a$=linear differentiation of velocity $v$= $A$ where t is time and $A<(2\pi f)^2$.

If the calculated absolute value of acceleration exceeds a preset value, the confocal microscope system performs control for the purpose of reducing the absolute value. More specifically, since acceleration is maximum when actuator 4 returns from the point of the maximum displacement to the point of minimum displacement, the time required for actuator 4 to return to the minimum displacement is increased, as shown in FIG. 13D, so that the absolute value of acceleration will not be exceeded. At this moment, even if returned to the point of minimum displacement during the camera's capturing of any single frame, the actuator must wait until the camera starts capturing the next frame. Therefore, if the time required for the actuator to return from the maximum displacement point to the minimum displacement point is defined as an integral multiple (twice in the case of FIG. 13D) of the period of the vertical synchronization signal, it is possible to set a return time that makes effective use of the frame update time.

Note that although a step wave, the voltage of which increases step by step as time elapses and returns to the original voltage (minimum displacement) when the prescribed voltage level (maximum displacement) is reached, is used as the scanning waveform as illustrated in FIG. 13B, it is possible to use a triangle wave instead as the scanning waveform. S-curve control is performed at these discontinuous points of change (turn-around points) in order to reduce acceleration.

As described above, it is possible to dramatically reduce acceleration, i.e., vibration as shown in FIG. 13E and obtain consistent images.

Note that it is possible to implement image processing unit 6b and waveform calculation unit 11b mentioned earlier by using personal computers.

As described above, one advantage provided by the present invention is that it is possible to precisely determine the displacement of the actuator for moving the objective lens in the optical-axis direction. Therefore, by synthesizing sliced images according to the displacement information, it is possible to realize a three-dimensional confocal microscope system whereby high-precision three-dimensional images can be created.

Another advantage is that by calculating acceleration at the time of the actuator's displacement according to the displacement signal output from the actuator and controlling the acceleration so that it does not exceed the preset value, it is possible to realize a three-dimensional confocal microscope system which is less liable to cause vibration and can provide consistent images. More specifically, by producing displacement data for the actuator using an A/D converter and utilizing, this displacement data, it is possible for the image processing unit to obtain high-precision three-dimensional images. In addition, it is possible to suppress vibration and obtain consistent images since acceleration resulting from the actuator's displacement can be kept below a given level.

Yet another advantage is that it is possible to maintain acceleration increase when the actuator moves from the maximum displacement point to the minimum displacement point below a given level, thereby reducing vibration and obtaining consistent images. At this point, by defining the time required for the actuator to return from the maximum displacement point to the minimum displacement point as an integral multiple of the period of the vertical synchronization signal, it is possible to set a return time that makes effective use of the camera's frame update time.

Yet another advantage is that by producing waveforms for the discontinuous points of change in the scanning waveform by means of S-curve control, it is possible to reduce acceleration at these points.

Consequently, it is possible to solve the problem that since the displacement of the actuator for moving the objective lens in the optical-axis direction is an estimated value based on the voltage applied, an error occurs between the setpoint of displacement and the actual value and therefore positional information in the depth direction of the sample become inaccurate, causing the three-dimensional image being constructed to be inaccurate.

Yet another advantage is that it is possible to solve the problem of maximum acceleration occurring thereby causing vibration when the actuator returns from the maximum displacement point to the minimum displacement point, causing the surfaces of the sample to become unstable and preventing the sample from being correctly observed.

It should be noted that the present invention is not limited to the above-mentioned embodiments and should be considered as illustrative and not restrictive. The present invention may be embodied in other ways without departing from the spirit and essential characteristics thereof. Accordingly, it should be understood that all modifications falling within the spirit and scope of the present invention are covered by the appended claims.

What is claimed is:

1. A three-dimensional confocal microscope system comprising:
    a confocal scanner for obtaining sliced images of a sample as confocal images;
    a video rate camera for converting said confocal images to a video signal;
    an image processing unit for converting said video signal to image data;
    an actuator for moving the focal position of a microscope's objective lens in the optical-axis direction; and
    control means for generating scanning waveform signals used to scan said objective lens in the optical-axis direction through said actuator;
    so that sliced images of said sample in the depth direction can be obtained, wherein said control means generates a triangular or step-like scanning waveform signal which has been corrected so that acceleration is kept virtually constant at discontinuous points of change in said scanning waveform signal and said actuator is driven by said scanning waveform signal.

2. The three-dimensional confocal microscope system of claim 1, wherein said scanning waveform signal generated by said control means is corrected with a quadratic function so that displacement s of said scanning waveform signal satisfies $$s = a \cdot t^2 / 2$$

where t is an elapsed time and $a = S/T^2$ (S is the scanning stroke of said objective lens and T is the duration of the downward slope of said scanning waveform signal), at discontinuous points of change in said scanning waveform signal and that acceleration is kept virtually constant.

3. The three-dimensional confocal microscope system of claim 1 or 2, wherein said control means comprises:
    a waveform calculation unit for determining by calculation the waveform of said triangular or step-like scanning waveform signal;
    an arbitrary waveform generator for storing and generating said scanning waveform in synchronization with a scanning waveform generation trigger signal;
    an actuator driver for driving said actuator according to said scanning waveform generation trigger signal output from said arbitrary waveform generator; and
    a signal controller for generating trigger signals synchronized with the video signal of said video rate camera and supplying said trigger signals to respective corresponding units.

* * * * *